(12) United States Patent
Romanowski

(10) Patent No.: US 7,595,104 B2
(45) Date of Patent: Sep. 29, 2009

(54) NBC BARRIER ADHESIVE TAPE STRUCTURE

(76) Inventor: John Romanowski, 5 Spring Rd., Londonderry, NH (US) 03053

( * ) Notice: Subject to any disclaimer, the term of this patent is extended or adjusted under 35 U.S.C. 154(b) by 243 days.

(21) Appl. No.: 10/641,450

(22) Filed: Aug. 16, 2003

(65) Prior Publication Data

US 2004/0071916 A1    Apr. 15, 2004

Related U.S. Application Data

(60) Provisional application No. 60/410,337, filed on Sep. 11, 2002.

(51) Int. Cl.
*B32B 9/00* (2006.01)
*B32B 33/00* (2006.01)

(52) U.S. Cl. .............. 428/40.1; 428/41.3; 428/41.5; 428/41.8; 428/906; 428/911

(58) Field of Classification Search ............... 428/40.1, 428/41.3, 41.5, 41.8, 354, 920, 906, 911, 428/214
See application file for complete search history.

(56) References Cited

U.S. PATENT DOCUMENTS 5,811,359 A * 9/1998 Romanowski ............... 442/261
6,183,861 B1 * 2/2001 Carroll ........................ 428/354

* cited by examiner

*Primary Examiner*—Patricia L Normeyer
(74) *Attorney, Agent, or Firm*—Davis & Bujold, P.L.L.C.

(57) ABSTRACT

An NBC barrier adhesive tape structure useful for the repairing, sealing and the reinforcement of NBC barrier materials used for protecting military personnel, equipment, supplies from nuclear, chemical and/or biological agents, and the like, comprising an NBC barrier film of a multilayer structure laminated with a fabric to provide a desirable adhesive tape that provides resistance to nuclear, chemical and/or biological agents and possesses favorable flexibility properties and is printable.

18 Claims, 3 Drawing Sheets

NBC BARRIER ADHESIVE TAPE STRUCTURE

The application is based upon provisional application Ser. No. 60/410,337 for an NBC (NUCLEAR, BIOLOGICAL, CHEMICAL) BARRIER ADHESIVE TAPE STRUCTURE, filed Sep. 11, 2002.

BACKGROUND OF THE INVENTION

1. Field of the Invention

This invention relates to NBC barrier adhesive tape structures useful for the repairing, sealing and reinforcement of NBC (nuclear, biological and chemical) protective materials that are for use in garments for personnel, shelters, tents, covers for equipment and supplies and the like. The NBC barrier adhesive tape structure may be a laminated barrier structure composed of multilayer plastic films and, in particular, to a composite, laminated plastic material which includes a layer of fabric substrate, and a layer of pressure sensitive adhesive covered by a layer of release liner and, alternatively, self wound without a release liner.

2. Description of Prior Art

Plastic barrier materials are involved in an almost unlimited range of products and applications. Containers, wrappers, pouches and bottles of varying degrees of flexibility for foods, pharmaceuticals, chemicals, and other products are commonplace. In addition to containing and protecting products, barrier materials are used to protect equipment and even personnel from a wide range of environmental hazards. One application of such barriers having particularly stringent demands is that of protecting military personnel, equipment, and supplies against (NBC) Nuclear, Biological and Chemical warfare agents. NBC barrier materials are used for protection of personnel, shelters, tents, equipment and supplies. The NBC fabrics are fabricated into protective shelters, tents, tarpaulins and covers for equipment and supplies and even protective clothing for personnel.

In addition to needing NBC barrier fabrics, there is also a need for an additional material that may be used in the repair, sealing, and reinforcement of these NBC barrier materials. The qualities of NBC barrier adhesive tape with sealing, repair and reinforcement qualities has many uses in the initial manufacturing, deployment and in field set up for sealing, maintenance and repair of the many NBC protective materials and end items. Such NBC barrier adhesive tape can extend the useful life of flexible and rigid NBC materials used in shelters (flexible and rigid), tarps, protective covers, collective protection tents, mobile equipment (aircraft, motorized vehicles, marine vessels) and personnel protective clothing by sealing, patching, and reinforcement of holes, cuts, tears or punctures in most any NBC material. Another important use is the taping over seams of previously unsealed and overlapping NBC materials or to reseal previously fastened but poorly sealed seams, or to tape over unsealed sewed or stapled seams or for the reinforcement of a variety of sealed seams that are subject to separating under normal use, fatigue, stress or wear.

Another important use of the NBC barrier adhesive tape structure is in the sealing and reinforcement of multi track extruded plastic zipper fastener systems, such as ITW's, Somerset, N.J. maxigrip extrusion profile plastic zippers which may be used in modular collective protection shelters, tents, tarpaulins, covers, protective clothing and the like.

Whether in the initial manufacturing, deployment, or field use of the above-mentioned items, there is a need for NBC adhesive barrier tapes. The NBC barrier materials may be repaired, sealed and reinforced so that they may continue to protect against a wide range of chemical and biological agents if they are damaged, worn, modified, etc. The pressure adhesive tape should also provide a barrier and resist penetration of NBC agents in various forms, solids, liquids, gases, and dust, including radioactive dust.

In addition to containing and protecting products, barrier materials are used to protect equipment and even personnel from a wide variety of environmental hazards. Here, in addition to being a barrier fabric, there is a need for a pressure sensitive adhesive tape material for use in the repair, sealing, and reinforcement of these materials so that they may continue to protect against a wide range of chemical and biological agents. The pressure sensitive tape should also provide a barrier and resist penetration of chemical and biological agents in various forms, solids, liquids, gases, dust, including radioactive dust. It should be easily made resistant to deterioration from ultraviolet light when used in long term outdoor applications and be readily disposable by military and industry standards. Of course, the adhesive tape should also be durable, lightweight, and very flexible so it can easily conform to the shape of the surface of the material to which it is being applied and be easily fabricated into various shapes, such as rolls of tape, patches disks and the like. In some instances where the barrier adhesive tape structure is to be used by the military in protective garments, covers, shelters and equipment enclosures of various colors, it should be made in a natural, clear color so it will appear to take on the color of the material it is applied to and make detection from the air or ground more difficult. It may also be made with an outer surface in a mat finish and dull color to escape detection from the air when applied to materials having a need for additional concealment. Yet again, in some instances where fire retardant barrier materials are being used in protecting military personnel, equipment and supplies, the barrier adhesive tape materials should be made fire-retardant. The outer surface should also be "printable" in that it should easily accept printed patterns such as those needed for camouflage or identification.

Because the attainment of some of these qualities often results in the sacrifice of others, e.g. the addition of the NBC barrier film to a pressure sensitive tape material may affect its flexibility, there is not presently available a material which satisfies the needs of the military or the commercial, industrial markets.

One of the better-known commercial films sometimes used as a barrier is the copolymer of vinylidene chloride and vinyl chloride, such as Saran® films, available from Dow Chemical Company, Midland, Mich. This material has a high resistance to attack by a wide range of chemicals, it has low permeability to gases and vapors, and it has high transparency. Moreover, it can be bonded or sealed to itself and to many other materials and substrates for special applications. The Dow Chemical Company has made and sold widely, combinations of SARAN® films and outer layers of polyolefin resins including low-density polyethylene (LDPE) and ethylene vinyl acetate (EVA), such as SARANEX® films. The SARANEX® films in turn have been further laminated or bonded to other materials. These films are, and have been, limited to four and five layer constructions and range in the 1.5 mil to 5 mil thicknesses.

Other multilayer films for protection use have been disclosed. For example, Henriksen describes a 3 layer barrier film (PE/*PVAE-1/PE) [PVAE is the symbol used to designate Vinyl Alcohol-ethylene copolymer] for protecting skin against hazardous chemicals in gloves, boots, hoods and coverall suits by positioning a protective garment adjacent to the skin and said protective garment comprising substantially water insoluble polymer material, as described in U.S. Pat. No. 4,902,558 and U.S. Pat. No. 5,059,477—an improvement designed to protect against epoxies and other hazardous chemicals. Such comprises a water insoluble polymer membrane shaped by extrusion or casting and or seamed by heat sealing or sewing into a glove, coverall suit, hood or boot. Also understood is a composite 5 layer composite chemical barrier film (Polyethylene/Adhesive/EVOH*/Adhesive/Polyethylene) [*EVOH is the ISO standard symbol for Ethylene Vinyl Alcohol], used in protective gloves which provides permeation protection of up to 24 hours against over 250 chemicals and chemical mixtures per ASTM F739, "Standard Test Method for Resistance of Protective Clothing to Permeation by Liquids and Gases" is further described in literature published (Form# 4H-PP-392) © 1992 by Ansell Industries Inc, Coshocton, Ohio and further described in the Ansell Protective Products publication, 6$^{th}$ Edition Form No. CRG-GC-Rev. 9-98, © 1998.

Tung in U.S. Pat. No. 5,250,350 discloses a modified burn characteristic SARANEX® film in the form of a four or five layer film product. Additionally, Boye et al., describes in U.S. Pat. No. 5,162,148 a laminated material comprising a polyolefin nonwoven substrate and a 5 layer co extruded film with a polyolefin outer layer and an intermediate layer selected from a group comprising ethylene-hydrolyzed vinyl acetate copolymer and polyethylene terephtalate coated with polyvinylidene chloride for manufacturing protective equipment against NBC attacks. Similarly, Smith, Jr., in U.S. Pat. Nos. 4,970,105 and 5,082,721 describes a fabric used in the manufacture of protective garments, containers and covers comprising an inner layer of a tear resistant, high tensile strength substrate and a film layer comprised of a fusible, meltable, polyhalogenated ethylene resin group bonded on at least one surface of said high modules fabric substrate. Bartacis discloses a multilayer structure in U.S. Pat. No. 4,924,525. This reference describes a multilayer film structure having an inner layer of substantially isotactic oriented polypropylene homopolymer sandwiched between a layer of ethylene-propylene random copolymer and a layer of ethylene-vinyl-acetate. The multilayer film structure is then bonded to a two layer polyester substrate using an elastomeric adhesive. In a preferred embodiment, a barrier material having a layer of ethylene-vinyl alcohol is combined with the multilayer film structure to form a composite, which is then combined with the substrate. Additionally, Adiletta, in U.S. Pat. No. 4,865,903, describes a flexible, impermeable, universally chemically resistant composite structure which may be fabricated into protective clothing. The composite structure comprises a fabric substrate and thermally-melt-bonded on both sides thereof, a coated film, which film comprises a PTFE film having a thermoplastic flouropolymer coating on both sides thereof. Reference is made to US Army Drawing 5-19-13821, "Roll, Repair Tape". The drawing is notated that the drawing's technical data is "Export Restricted" by the Arms Control Act (title 22, U.S.C. Sec 2751 of the Export Administration Act of 1979, as amended. The technical information disclosed in the drawing is also governed by the International Traffic in Arms regulations. Additional references for adhesive tapes are cited in the following U.S. patent documents.

| | | | |
|---|---|---|---|
| 3,394,799 | July, 1968 | Ritson | 428/354 |
| 3,716,437 | February, 1973 | Newman | 428/354 |
| 4,303,724 | December 1981 | Sergent | 428/354 |
| 4,705,715 | November, 1987 | Decoste | 428/354 |
| 4,740,416 | April, 1988 | Decoste | 428/354 |

-continued

| | | | |
|---|---|---|---|
| 4,992,331 | February 1991 | Decoate | 428/354 |
| 5,108,815 | April 1992 | Adams | 428/354 |
| 6,183,861 | February 2001 | Carroll | 428/354 |

Despite the foregoing disclosures, there is still a need for an adhesive tape material that also serves as a NBC barrier adhesive tape structure that will protect against nuclear, biological and chemical agents that is very flexible, thin gauge, light weight, durable, with excellent adhesion properties to a variety of NBC materials and coatings that can be used specifically in the repairing, sealing and reinforcement of nuclear, biological and chemical (NBC) protective materials (rigid and flexible) used for protective garments, covers, tents and shelters for personnel, equipment and supplies. Currently, repair, sealing, reinforcement of NBC fabrics requires heat sealing or sewing and specialized tools and skills which are not readily available for in field repair. Additionally, rigid NBC materials require special type gasketing materials and sealants at seams, doors and covered openings. There is not currently a NBC barrier adhesive tape material which satisfies the NBC barrier, adhesion, flexibility needs required by the military and industry. Thus, an NBC barrier adhesive tape structure is a quick, easy, inexpensive, practical alternative that allows the NBC material to be placed back in service after the needed service (repair, seal or reinforcement) is completed. NBC protection materials which have been damaged by holes, tears, seam separations, punctures and the like including stress point reinforcements can be performed in the field, quickly and inexpensively.

There is a need for such a barrier structure also having antistatic properties. There is also a need for such a barrier structure also having fire-retardant properties. Reference is made in this connection to my prior U.S. Pat. No. 5,344,697 granted Sep. 6, 1994, U.S. Pat. No. 4,975,316, and U.S. Pat. No. 5,811,359, the contents of which are hereby expressly incorporated herein by reference.

The reinforcing fabric substrate will impart the necessary strength to the multilayer barrier film and the resulting laminated composite structure is resistant to NBC agents and is coated on one side with a pressure sensitive adhesive and covered with a protective release liner material. The composite NBC barrier adhesive tape structure may also be resistant to burning, or be self extinguishing, and may also be antistatic. The NBC adhesive barrier material may use a silicone coated or similar releasing coating on the release liner that is placed over the pressure sensitive adhesive to prevent the material from sticking to itself and to protect the adhesive when wound in roll form. Alternatively, when desired, the NBC adhesive structure may also be made without the release liner by having the side opposite the adhesive surface treated with one of the commonly used methods of release coating to prevent the permanent sticking or blocking of the adhesive to the opposite side of the barrier structure. Such NBC barrier adhesive tape structures made in accordance with the invention, offer "hold out" and resistance to the permeation of a variety of chemical warfare agents, for example, Mustard and Thickened GD in addition to also holding out against toxic biological and nuclear agents. As may be determined from the foregoing composite adhesive tape materials, however, none provides such a combination of unique properties or protection from these NBC agents.

OBJECTS OF THE INVENTION

A principal object of the present invention, accordingly, is to provide a new and improved NBC barrier adhesive tape structure that shall not be subject to the before-described and other limitations of prior structures and that provides a material having substantially all of the desired qualities necessary to protect personnel, equipment and supplies from nuclear, chemical agents and biological solids, liquids, gases, and dusts agents while still maintaining superior internal lamination strength of its components, including composite barrier film and reinforcement components, so as not to delaminate while in use in a hostile environment, or under long-term storage,—all while still offering high adhesion strength to materials and, while also being light weight, thin gauge, highly flexible, hand tear-able, and preferably see-through for color matching "take on" appearance to NBC materials and with printability, as well.

A further object is to provide such a novel barrier tape structure which resists permeation by solids, liquids, gases, and dusts, particularly radioactive dust and liquids, and is durable and relatively easily produced on a large scale and by known manufacturing methods.

A further object is to provide such a barrier structure which is disposable by military and industry standards and, when required, is fire-resistant and offers a degree of fire-retardancy.

Still another object is to provide such a barrier structure which is resistant to delamination of the NBC barrier and reinforcement layers by solvents, wear or environmental hazards and has increased shelf and storage life for use in a wide range of hot and cold temperatures, resisting degradation caused by environmental factors including exposure to weather, aging and ultraviolet radiation.

Another object is to provide a novel barrier structure of this character which is easily fabricated by known industry methods into pressure sensitive adhesive tapes, patches and disks for the repair, reinforcement, and sealing of NBC protective covers, shelters, tents, garments and the like.

Still another object is to provide in this novel barrier structure versatility, light weight, and thin gauge, also with soft, flexible and of good drape properties.

Yet a further object is that the barrier structure shall have a low odor adhesive so that when used or stored in confined spaces, it is not offensive or irritating to the senses.

Another object is that the novel barrier structure can be embossed with a variety of patterns for greater softness, flexibility and increased drape properties, including surface embossing to provide an anti-skid surface on the tape when walked on while being covered by liquids, snow and mud.

Yet another further object is to provide the barrier structure with a release liner over the adhesive to provide continued protection for the adhesive so that the tape can be peeled off a roll in predetermined strips and later be applied to the surface of the targeted material.

Still another object is to enable the barrier structure to assume a high gloss surface, where desired, designed so that it is shiny and has a high gloss when these qualities are desired.

Still another object is a barrier structure that is useful over a wide range of temperatures and environmental conditions.

Yet a further object is to insure that the barrier structure is low in bulk, easily reduced to a small shape after fabrication, and easily packaged and stored in a minimal amount of space.

Other objectives are to provide, where needed or desired, a barrier structure which is relatively quiet and low noise generating to the wearer or user when the material it is applied to is moving, and further enabled to be applied with a minimum amount of energy and with a minimal amount of spring back or memory in the tape, also being resistant to curl and peel when used in high traffic areas, such as floors, entryways, and the like when the tape is applied to itself or to another surface in multiple layers.

Another object of the invention is to have the NBC barrier adhesive tape structure stick to a wide variety of untreated metal surfaces with or without specialized NBC barrier paints, treatments or coatings, and to a wide variety of untreated surfaces of plastics, including but not limited to polyolefins of various molecular weights, such as lineal low, low, medium and high density and blends including metallocene resin and chlorinated polyethylene and vinyl blends.

Yet another object to the invention is to provide such a novel barrier tape that can stick to a wide variety of polymer resins and films such as chlorinated polyethylene and specialty resins such as Dupont® Hytril and the like that are used to make specialty extruded profile closure systems for NBC protective garments, collective protection systems, tents, covers, tarps and shelters.

SUMMARY OF THE INVENTION

In summary, in its application to barrier tapes the invention preferably embraces a lightweight highly flexible high pressure-sensitive adhesion NBC barrier-containing laminated layered tape structure comprising a multi-layered barrier composite film resistant to chemical, biological and nuclear agents having an inner center barrier core layer sandwiched between outer layers of low density polyethylene laminatingly adhered to opposite surfaces of the core layer; a strength-imparting reinforcing substrate layer of fabric laminatingly adhered on an inner side to an adjacent surface of the barrier film; a release layer adhesively laminated over the opposite surface of the barrier film to said adjacent surface; and the fabric substrate layer being non-woven and hand-tearable.

Such tape structures provide NBC pressure sensitive adhesive barriers capable of adhering to a multitude of surfaces of NBC materials and capable of resisting liquid, gaseous and solid chemical and biological agents and nuclear liquids and dust. The barrier structures of the invention are useful in sealing, repairing and reinforcing a wide variety of items such as protective garments, covers, tents and shelters (rigid and flexible) which may be used by military or civilian personnel in situations in which there is susceptibility to chemical and biological warfare agents, liquids and dust, in particular nuclear dust, and for industrial chemicals and toxic biological organisms, and wherever the danger of fire exists, be made to exhibit a degree of fire-retardancy.

The NBC adhesive barrier tape structure has a component of a multilayer barrier film for resisting nuclear, chemical and biological agents laminated with a second component which imparts strength and reinforcement, as by hot melt adhesive, but more preferably by thermal lamination by hot roll, and most preferably by hot polymer extrusion lamination. A third component of the NBC barrier adhesive tape structure in one embodiment is a layer of pressure sensitive adhesive that is applied to the barrier film side to provide adhesion to a wide variety of materials including but not limited to metals, NBC protective coatings and coverings on metals and composite materials and a wide variety of plastics that may be found on a multitude of rigid and flexible surfaces, including a wide variety of NBC barrier materials and protective fabrics. A fourth component of the structure is a release liner material used to cover and protect the adhesive layer and subsequently allows the continuous length of tape to be further processed by protecting the adhesive and enabling ultimately slitting and rolling into small individual rolls without sticking to itself (blocking). Alternatively, the release liner in another embodiment may be eliminated in favor of having the barrier film top surface corona treated and then coated with an additional releasing layer, called a "release coating' after which the adhesive is applied to the opposite fabric side. This allows the tape then to be rolled upon itself, and further processed into small length and width rolls by rewinding without blocking or sticking to itself without the need for a release liner. This type of tape is said to be "self wound".

The NBC barrier adhesive tape structure may have two layers of the first component barrier film containing NBC barrier material. The NBC barrier adhesive tape structure further may include additional layers in the first and/or second components for releasing the adhesive coating, additional chemical/biological resistance, abrasion resistance, increased puncture and tear strength, additional heat sealing strength, fire retardant additives, UV additives, color pigments, which have low reflective qualities for both light and radar illumination or for influencing the infrared reflectance which make it relatively indistinguishable from land background and increased (UV) ultra violet light protection for continued long term outdoor exposure.

The scrim fabric bottom layer of the tape is preferably nonwoven for greatest flexibility, or, if desired, it may be of an appropriate woven fabric substrate to impart reinforcement strength to the first component. Where an external pressure-sensitive adhesive is used in the tape, good adhesion is provided to a wide variety of NBC rigid and flexible surfaces, including metal, plastic and high bread composite materials, including uncoated and coated, painted and unpainted surfaces. Where a release coating is applied directly to the barrier, this allows the tape to be self wound upon itself without blocking, and later unwound without damaging the adhesive layer.

Other features of the present invention will become apparent from the following detailed description when taken in connection with the accompanying drawings. It is to be understood that the drawings are designed for the purpose of illustration only and are not intended as a definition of the limits of the invention.

Preferred are best mode embodiments and designs are hereinafter set forth in detail.

BRIEF DESCRIPTION OF THE DRAWINGS

The above and other features, objects and advantages of the present invention and best mode and preferred designs will be better understood from the following specification when read in conjunction with the accompanying drawings, in which.

DETAILED DESCRIPTION

Figure 1A:
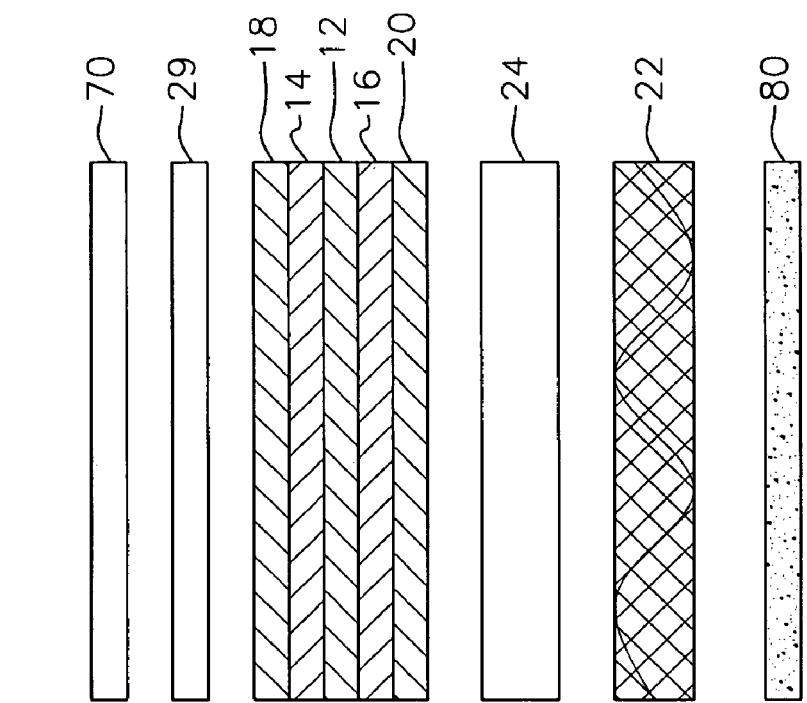
FIG. 1A is an exploded schematic cross-section of an alternate composite fabric embodying the present invention.

This invention, as before explained, pertains to NBC barrier adhesive structures having, in one form, a first component comprising a multilayer film for resisting chemical, biological and nuclear agents and a second component attached to the first component for imparting strength to the NBC barrier and a third component attached to the composite barrier structure comprised of pressure sensitive adhesive for adhesion to other surfaces and a fourth component comprising a release liner material used to cover and protect the adhesive layer which as a composite material is continuously rolled onto itself and later rewound and slit into smaller width and length rolls.

The first layer of the first component may be multilayer itself and at least one layer of the first component contains NBC barrier material which may be the same as or different than the remaining other layers.

As before described, a first component of the tape structure may be any multilayer barrier film capable of resisting nuclear, biological and chemical agents. One such barrier is the five layer co-extruded barrier film of FIGS. 1 and 1A, with the two outermost layers 18 and 20 of the same or different composition of materials, each containing the same or different additives with both the outer layers surrounding the core layer 12 which is comprised of a barrier resin compound suitable for NBC protection. In the five layer barrier film, the center core layer 12 of the film is comprised of any barrier material, preferably SARAN® film, which is a copolymer of about 75 to 85% by weight of vinylidene chloride monomer, with vinyl chloride monomer making up substantially the balance of the core which is surrounded by the two outer layers 14 and 16 comprised of the same or different materials, such as (EVA) ethyl vinyl acetate copolymer, polypropylene, polyethylene (PE) (polyethylene (PE) may be one of the various molecular weights, such as low, lineal low, medium, high, or metallocene, or a blend thereof), or a chlorinated polyethylene material blended with 10 to 28% by weight of a fire-retardant material; preferably, 20% of PPG FSP-105 with a low density polyethylene carrier resin when fire-retardant qualities are desired. The making of SARAN® films, EVA copolymers, polypropylenes, polyethylenes of various molecular weights, metallocene's and chlorinated polyethylenes film layers are well understood in the art.

The layers surrounding the core barrier material may also contain anti-block, slip, fire retardant or filler additives as necessary for processing the barrier film and to get the desired physical properties and burning characteristics. The total thickness of the five-layer co-extruded film F can be between 0.5 to 4.5 mils thick, with each of the layers proportionate to each other. The preferred film is SARANEX® film four layer film type is 23P and the most preferred film type is the SARANEX® 14P five layer film. The production of such a co-extruded, multiple-layered SARANEX® film types 23P and 14P of this invention with the core barrier and the attaching layers are understood art and is described in U.S. Pat. No. 4,681,797.

Similar constructions can also be used to make the barrier film, comprising two or more layers using layers of polypropylene, polyethylene (PE) of various molecular weights, including metallocene films, and film comprising the following composites; PE/nylon/PE, PE/nylon/SARAN® (film, PE/nylon/SARAN®/PE film, PE/nylon-SARAN®-EVOH, PE/ethylene vinyl alcohol (EVOH)/Saran®/PE, or PE/ethylene vinyl alcohol (EVOH)/PE, PE/Vinyl Alcohol-ethylene copolymer/PE as described in U.S. Pat. Nos. 4,902,558 and 5,059,477, PE/adhesive/Polyester/adhesive/PE, or PE/adhesive/EVOH/adhesive/PE as described in Ansell Edmont Industrial literature Form# 4H-PP-392, or polyethylene/nylon/ethylene-vinyl alcohol or combinations of any of the above individual layers may also be used to get the desired NBC barrier "permeation hold out" characteristics.

Other such examples which may be used for the fire-retardant barrier film include four- and five-layered co-extruded modified burn characteristic films, such as SARANEX® films, available from Dow Chemical Company, and described in U.S. Pat. No. 5,250,350; and similar constructions.

The multilayer film contains the NBC barrier material in at least one layer. The inner layer(s) being the most preferred in three, four and five layer structures. In the more preferred SARANEX® films for NBC hold out of chemical agents HD (mustard) and TGD (thickened soman) of less than 110 minutes as tested by Mil Std 282, methods 204 and 206, the four and most preferred five layer NBC film, contains a barrier material in the center layer with both the outer and inner layers surrounding the core barrier. The five layer film F incorporates layers arranged in the following order: low density polyethylene 18/ethyl vinyl acetate (EVA) 14/copolymer of vinylidene chloride and vinyl chloride 12/ethyl vinyl acetate 16/low density polyethylene 20. A four layered film may include layers arranged in the following order: low density polyethylene 18/ethyl vinyl acetate (EVA) 14/copolymer of vinylidene chloride and vinyl chloride 12/ethyl vinyl acetate 16. These films are described in U.S. Pat. Nos. 3,479, 425, 3,557,265, 4,681,797, 4778,715 and the modified burn characteristic SARANEX® films and described in U.S. Pat. No. 5,250,350; the contents of each of these patents are hereby expressly incorporated by reference.

In alternate three, four and five multilayer films, they contain the NBC barrier material in at least one layer—the inner layer(s) being the most preferred in the three, four and five layer structure. In the more preferred films for NBC hold out of chemical agents HD (mustard) and TGD (thickened soman) of greater than 110 minutes as tested by Mil Std 282, methods 204 and 206, the three, four and most preferred five layer NBC film, contains a barrier material in the center layer 12 with both the outer and inner layers 14 and 16 surrounding the core barrier. The five layer film may also incorporate layers arranged in the following order: low-density polyethylene/adhesive/EVOH/adhesive/low density polyethylene as described in Ansell Edmont Industrial literature Form# 4H-PP-392 and hereby expressly incorporated by reference. The three layered film may include co-extruded layers arranged in the following order: low-density polyethylene/EVOH/low density polyethylene. The three layered film approximately 2.2 mil thick construction: Polyethylene/Vinyl Alcohol-ethylene (PAVE-1)/Polyethylene copolymer film as supplied by Kuraray Co. Ltd, Osaka, Japan and described in U.S. Pat. Nos. 4,902,558 and 5,059,477 are hereby expressly incorporated by reference. The four layered film may include co-extruded layers arranged in the following order: low-density polyethylene/EVA/EVOH/EVA/low density polyethylene.

The barrier film component may further include second and third layers on opposite sides of the barrier film. The second or third layers may also contain a NBC barrier material or may be present for imparting various qualities to the first component; e.g. a nonstick releasing surface, a finished surface of a mat, gloss or embossed pattern, or for abrasion resistance or color, or to increase the thickness and/or the performance qualities of the overall barrier. The NBC barrier material in the second and or third layers may be the same or different as that in the first component. The second and third layers of the first component can be made of any material capable of being attached to the first layer and carrying additional reagents if necessary, e.g. fire-retardant materials, UV additives, or pigments. An example of materials useful for the second and third layers of the first component are: the polyolefins including polyethylene of various molecular weights, metallocene blends, polypropylene, chlorinated polyethylene, ethylene vinyl acetate, ethylene-acrylic acid polymers such as Primacore® E/C Polymers, available from Dow Chemical Company, or SURLYN® polymers, available from E. I. du Pont de Nemours and Company, and blends thereof, and more particularly low density polyethylene (LDPE).

Chemical and biological agents are agents, which are used in chemical or biological warfare. Examples of chemical agents include nerve agents such as agent Soman (GD) O-pinacolyl methylphosphonofluoridate, agent (VX) O-ethyl-S-2-(diisopropylaminoethyl) ethylphosphonothioate, and agent Sarin (GB))-O isopropylmethylphosphonofluoridate, agent GA (Tabun) and blistering agents such as mustard (HD) bis (2-chloroethyl) sulfide and agent L (Lewisite) along with blood agents AC (Hydrogen Cyanide and CK (Cyanogen Chloride) and choking agent CG (phosgene). Examples of biological agents are Anthrax, Tularemina, plague, cholera and diphtheria. Rickettsia (Q fever), Rocky mountain spotted fever and Typhus. Viruses like encephalitis, dengue fever, yellow fever, rift valley fever and influenza. Toxins like botulinum toxin.

Nuclear agents are those agents that can be transported in a solid, liquid, gas form, including any combination at the same time and to a limited degree nuclear radiation.

These examples are not intended to be limiting and if first layer is capable of resisting at least one of these agents, then it is intended to be encompassed by the language "resisting nuclear, biological and chemical agents" for purposes of this invention.

The structure of the invention, as before mentioned, includes other components laminated to the barrier film F. A second component so attached to the barrier film first component includes a substrate of fabric 22 for imparting strength and durability to the NBC barrier adhesive tape structure, making the barrier film more resistant to tears, puncture and elongation. The second fabric component may be made up of a multilayer system such as a woven or nonwoven fabric or scrim.

Figure 1:
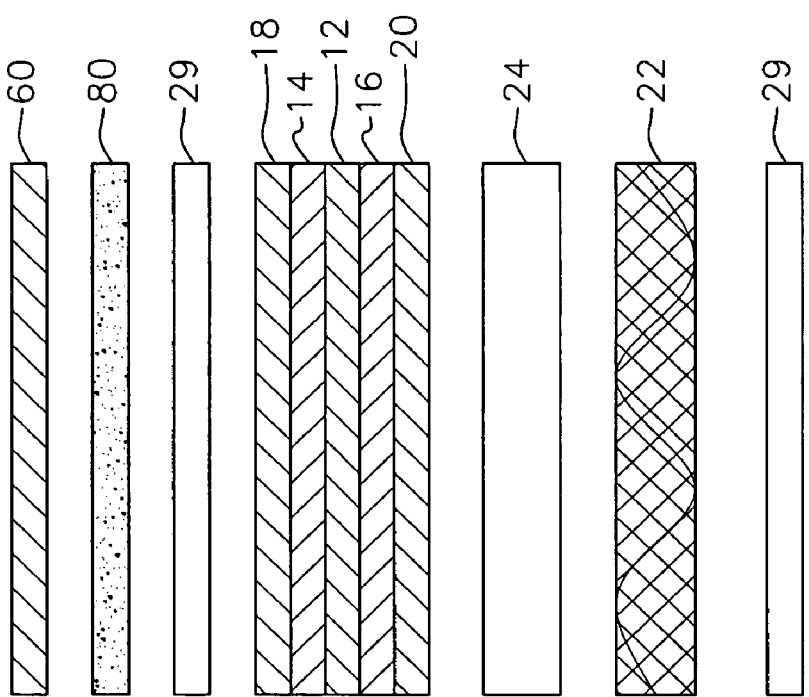
FIG. 1 is an exploded schematic cross-section of a composite fabric according to a preferred embodiment of the present invention.

A third component of the composite tape structure in the embodiment of FIG. 1, is a pressure sensitive adhesive 80, applied to the composite barrier, preferably on the fabric side 22 when making the NBC barrier tape without the use of a release liner as in FIG. 1A, but most preferably transferred to the barrier film side via the coated release liner 60 of FIG. 1, which may be identified as a fourth component in such a release liner construction.

The pressure sensitive adhesive layer 80 may be any natural or synthetic adhesive material, preferably a natural or synthetic rubber, butyl rubber, butadiene rubber, acrylic, or any adhesive known to the art capable of causing the adhesion of the NBC barrier structure to adhere to any surface, including its own, when layered. The coated release liner 60 of FIG. 1, such as of silicone, functions as the carrier surface for the application of the adhesive at the coating station and then continues through the drying oven to cure and dry the adhesive. When the adhesive is oven dried, it is then ready for further lamination to the NBC barrier reinforced composite by causing the exposed surface of the adhesive to come in direct contact with the NBC barrier reinforced composite structure at the nip rolls, as later described in connection with FIGS. 2 and 3.

The adhesive coating and laminating is the most preferred process where the adhesive is coated and laminated to the NBC barrier composite all in one machine pass with a single side silicone release liner. In an alternative preferred method, the adhesive can be coated on a two-side silicone release liner and subsequently rolled upon itself and at a later date, be unwound and laminated between two pressure rollers to the reinforced NBC barrier composite film structure with the same end result.

Once applied, the release liner 60, FIG. 1, will, upon demand, release and fully separate from the adhesive 80, thus completing the full transfer of the adhesive from the release liner to the NBC barrier structure F. Once the liner is removed, the exposed adhesive surface may be affixed to the intended targeted material. Additional layers of tape may also be applied to the surface, overlapping the edges of the tape to provide a good seal. Prior to demand separation, the release liner 60 serves to provide continual protection to the pressure sensitive adhesive layer in the final composite NBC Barrier adhesive tape structure, whether it remains in roll, sheet or strip form. For the purposes of the invention, the release liner is silicone coated poly paper on one or two sides which may be a natural or bleached color in a 2 to 5 mil thickness.

On an embodiment where high strength, demanding durability and heavier weight are most suitable, as for use in military protective clothing, covers, tents, and shelters, a woven fabric 22 is more desirable. The reinforcement fabric is preferably woven from a high-density polyolefin material coated on at least one side with a low-density polyolefin material, as at 24 on FIG. 1A. The most preferred fabric is woven from high-density polyethylene material sandwiched between two layers of low-density polyolefin material when more strength and barrier are desired. The term "fabric substrate" is herein intended to be a general term encompassing any fabricated natural or synthetic material, whether woven, nonwoven, spunbonded, wet or dry laid, knitted, spunlaced, needled punched, felted, or otherwise constructed. For example, the fabric may be selected from the group consisting of nylon, cotton, polypropylene, PBI, hemp, cellulose, silk, polyester, viscose, asbestos, acrylic, acetate, flax, fiberglass, wool, polyethylene (various molecular weights), aramid, rayon, jute, manila, NOMEX®, KEVLAR® material, and blends thereof. The most preferred woven fabric is one manufactured by Fabrene, Inc. North Bay Ontario, Canada and is a 9×9, weave count construction with the preferred style in a one side LDPE coated, finished approximate weight 2.8 oz/sy, and a most preferred style, 2 side LDPE coated in a finished approximate weight of 3.5 oz/sy both made of natural color, orientated, slit tape, high density polyethylene yarns which may contain additives for strength, fire-retardancy, color, UV resistance, and the like.

Sufficient short term protection against the degrading effects of the environment and sunlight (UV) exposure of the NBC barrier is afforded by the top layer and/or inner layer(s) of the barrier film and generally there is no need for additional additives for short term protection. Where longer protection is desired, it can be achieved by the addition of a suitable color pigment and/or the addition of a UV stabilizer. The color pigment and/or UV stabilizer can be added to any layer of the first component and second component as necessary by weighing the cost-benefit relationship in order to achieve the desired level of protection. While the traditional stabilizers are known to the art, such as absorbers (e.g. enzophenones) or quenchers (e.g. nickel compounds) are satisfactory, the most preferred embodiment use hindered amines, such as TINU-VIN® and CHIMASSORB® amines, available from Ciba-Geigy Corporation, Hawthorne, N.Y. Where maximum UV and environmental protection are desired, the preferred embodiment will utilize these concentrates in about 0.1 to about 0.5 percent concentration by weight, preferably, a concentration of about 0.25 percent, by weight is used. The preferred concentrates TINUVIN® 622 and CHIMASSORB® 944, are used for maintaining the flexibility and cost effectiveness for EVA copolymer and polyolefin layers, in particular polyethylene. In fabric substrates that contain polyolefin oriented slit tapes, TINUVIN® 622 is desired where water carry-over is a factor, TINUVIN® 783 is more desirable where food contact approval in necessary, and where less demanding requirements are needed TINUVIN® 770 is most desirable.

The fire-retardant material is a material capable of imparting favorable fire-retardant characteristics or flammability characteristics into a layer of a different material e.g. reduces or eliminates its tendency to burn. The term fire-retardant material is intended to include single fire-retardant agents, or combinations of other fire-retardant compounds that enhance the performance of fire-retardant agents or combinations thereof. Examples of such fire-retardant materials may include combinations of antimony oxide, antimony trioxide, arsenic, octadecanoic acid, aluminum salt, aluminum tristerate, lead oxide, 1H-isoindole-1,3(2H)-dione,2,2'-(1,2-ethanediyl) BIS (4,5,6,7-tetrabromo) chlorinated paraffins, halogenated non-metallic elements such as chlorine, fluorine, bromine, astatine, iodine and "Nochar's Fire Preventer, available from Nochar, Indianapolis, Ind.

The substrate fabrics that are used in the NBC Barrier adhesive tape of the invention may also, and for greater flexibility, preferably, include non-woven substrates (22 in FIG. 1, for example) made of TYVEK® fabrics, available from E. I. du Pont de Nemours and Co., Wilmington, Del., various natural and synthetic fiber nonwovens, such as olefin material fabrics, available from Kimberly Clark Corp., Roswell, Ga., Dexter, N. Windsor, Conn. and PGI, N. Charleston, S.C. and a variety of polyolefin fabrics including CLAF®, RFX®, fabrics, available from Atlanta Nisseki CLAF Inc., Atlanta, Ga. and other natural and synthetic fabric substrates. These fabric types and suppliers are not intended to be limiting, and if the second component is capable of imparting at least an increase in strength and durability over the NBC barrier film, then it is intended to be encompassed by the language "fabric substrate" for purposes of this invention.

The preferred non-woven fabric substrate 22 for NBC Barrier adhesive tape, covers, tents and shelters is a polyolefin, in particular a nonwoven polyolefin and more preferably an olefin of polyethylene. Most preferably "CLAF® fabric is used. The unique properties of CLAF® fabric nonwovens make it desirable for use as a fabric substrate. The preferred fabric substrates are types EX, LX, HX, LS, HS, MS, SSS, SS and S. more preferably types SS and S and most preferably type S.

Where particular application requirements demand a stronger, heavier, harder tearing or less elongation, stiffer, less flexible substrate, type EX, LX, HX, LS, HS, MS is preferred. In the soft, flexible, easier tearing, S and SS fabric is more preferred; while the most preferred fabric type S provides a good balance of drape, softness, flexibility, hand tear-ability and strength. The color of the nonwoven scrim may be matched to the overall color requirement of the NBC barrier adhesive tape, with the colors, yellow, green, red, black, beige and natural are preferred, beige and natural more preferred and the most preferred being natural.

The fabric substrate may be attached to the NBC barrier by a number of laminating methods. The methods of attaching the before-described first and second components are arts that are well known in the industry and can be achieved with thermal lamination, hot roll with or without scatter coating a heat activated adhesive resin, hot melt adhesives, or any combinations thereof or by extrusion coating/lamination. The preferred method of laminating the fabric substrate 22 to the barrier film F is by hot melt adhesive coating, solvent urethane based adhesives such as that identified as Twin Set®, offered by Shawmut Mills, W. Bridgewater, Mass., or adhesive web, and more preferred by thermal hot roll methods Twin Set Green and still the most preferred method by extrusion coating/lamination process with any material capable of causing a lamination. The preferred laminating material is a polyolefin, and more preferably a polyethylene, and most particularly low density polyethylene.

The term "laminate" is used herein to mean a multilayer structure prepared by coating and laminating one or more layers onto a film or fabric substrate.

A flammability characteristic is the ability of the NBC barrier composite to resist burning or be self extinguish when lit with a flame for certain duration of time. The shorter the duration of time for self-extinguishing, the more favorable the flammable characteristic of the barrier structure. The term "flammability characteristic" for purposes of this invention is interchangeable with "after-flame time".

This invention also pertains to a NBC barrier adhesive tape structure having a barrier characteristic of at least 45 minutes resistance to chemical warfare mustard agent H and a resistance of at least 100 minutes of thickening GD chemical warfare agent based on the methodology described in IAW Military Standard-282, "Filter Units, Protective Clothing, Gas Mask Components and Related Products: Performance Test Methods", test methods 204 and 206, the contents of which are hereby expressly incorporated by reference.

The methodology of IAW Military Standard-282, methods 204 for Mustard (HD) and 206 for TGB, modified for tGB (qualitative) are art recognized and available to the public from US Army, SBCCOM, AMSSB-RRT-CA, Abeerdeen Proving Ground, Md. or Geomet Technologies Inc., Gaithersburg, Md. the contents of both the military standard method and the related methods identified are hereby expressly incorporated by reference. One of ordinary skill in the art would know how to conduct such tests on the material of the present invention after reading the published guidelines.

In a preferred nonwoven fabric substrate embodiment of the invention, such pertains to a NBC barrier adhesive tape structure having a barrier characteristic of at least 45 minutes resistance to chemical warfare mustard agent H and a resistance of at least 100 minutes of thickening GD chemical warfare agent based on the methodology described in IAW Military Standard-282, "Filter Units, Protective Clothing, Gas Mask Components and Related Products: Performance Test Methods", test methods 204 and 206, the present invention again involves a combination of two basic components. The first component is a co-extruded four or five layered SARANEX® film F, preferably type 23P or 14P, most preferably type 14P. A further layer of polyolefin, preferably polyethylene, and most preferably low-density polyethylene may be added to one side of the SARANEX® film before or preferably after the barrier film is laminated with the second fabric component 22 to serve one or more purposes such as increasing the NBC resistance, abrasion resistance, carrying pigment or other additives to give desired coloration reflection characteristics or resistance to ultraviolet radiation or to add fire-retardancy, to serve as a printing surface for such purposes as camouflage or any of the earlier described benefits.

The second component preferred non-woven fabric substrate embodiment of the NBC barrier structure includes a layer 22 of fabric material which has been made into a non-woven fabric in continuous roll form, preferably CLAF® type SS and most preferably CLAF® type S in the natural color. The layer of NBC barrier film is coated on one side of the NBC film with a molten layer of low density polyethylene which may contain additive materials to serve one or more purposes such as increasing the NBC resistance, abrasion resistance, carrying pigment or other additives to give desired coloration reflection characteristics or resistance to ultraviolet radiation or to add fire-retardancy. During this coating process, the second component, CLAF type S is introduced to the molten polymer creating a sandwich of layers while all the components pass through a set of pressure and cooling rollers that cause the materials to fuse together to form a reinforced NBC barrier structure of this invention that is a most suitable substrate for a NBC barrier pressure sensitive adhesive tape, for the repair, sealing or reinforcement of protective garments, covers, tarps, collective protection shelters, and tents.

In the most preferred alternate embodiment to the NBC barrier adhesive tape structure having a barrier characteristic of at least 45 minutes resistance to chemical warfare mustard agent H and a resistance of at least 100 minutes of thickening GD chemical warfare agent based on the methodology described in IAW Military Standard-282, "Filter Units, Protective Clothing, Gas Mask Components and Related Products: Performance Test Methods", test methods 204 and 206 of the NBC barrier structure, the top, exposed layer of the first component of the already laminated composite fabric, is coated or treated with a release coating so that when the pressure sensitive adhesive is applied to opposite side (the already laminated NBC barrier's composite back side), it can roll up upon itself without a release liner. The intent of the release coating is to prevent the roll of pressure sensitive adhesive from blocking or sticking together forming a unwindable log and also allow roll to be unwind without loosing, transferring the adhesive to the release coating. It is important to note on the NBC barrier adhesive tape that is wound upon itself significantly differs from the release liner tape. The self wound has the pressure sensitive adhesive applied to the reinforcement side and the release coating is applied to the NBC composite film exposed top side. When "self wound" tape is applied to a surface, the exposed layer is the release coating layer on top of the NBC film of the first component.

In the NBC barrier adhesive tape of FIG. 1, utilizing the added protection of a release liner 60, the adhesive 80 is applied to the top, exposed layer of the NBC first component film F via the coated release liner 60, causing the fabric reinforcement side of the NBC barrier adhesive tape structure to be fully exposed when the tape is applied to a surface.

In the embodiment of FIG. 1, the tape construction may have a barrier characteristic of at least 45 minutes resistance to chemical warfare mustard agent H and a resistance of at least 100 minutes to chemical warfare soman agent of thickening GD based on the methodology described in IAW Military Standard-282, "Filter Units, Protective Clothing, Gas Mask Components and Related Products: Performance Test Methods", test methods 204 and 206, using a four- or five-layer NBC barrier film F comprised of a SARAN® high barrier resin core layer 12 approximately 0.25 (¼) mil in thickness sandwiched between outer adhesive layers 14 and 16 generally comprised of EVA, which may also be about 0.20 (⅕) mil in thickness. To the top of the sandwich, an upper layer 18 of low density polyethylene of about 0.675 (⅔) mil in thickness is applied, and at the bottom of the sandwich a similar lower layer 20 of low-density polyethylene of about 0.675 mil thickness is applied. The top layer may further include pigments for color, ultraviolet resistant additives and have a mat or gloss finish. Another additive may be included for the purposes of influencing the infrared reflectance.

In an alternate four-layer fire-retardant barrier film, layer 20 is eliminated while increasing layer 16 by 0.675 mil and by increasing layer 18 to a thickness of 1.25 mil, which now may contain an optional majority blend of chlorinated polyethylene. The total film thickness will range from 2 to 4 mil.

Alternatively, in the embodiment of FIG. 1, a three or five layer film construction may have a barrier characteristic of at least 110 minutes resistance to chemical warfare mustard agent H and a resistance of at least 110 minutes of thickening GD chemical warfare soman agent based on the methodology described in IAW Military Standard-282, "Filter Units, Protective Clothing, Gas Mask Components and Related Products: Performance Test Methods", test methods 204 and 206 in a three layer NBC barrier film. In the three layer barrier film, it is comprised of a PVAE-1 high barrier resin core layer 12 sandwiched with outer layer 14 and 18 combined into one homogeneous layer, and at the bottom of the sandwich, a similar lower homogeneous layer 16 and 20 combined with both 14/18 and 16/20 comprised of low-density polyethylene. The total film thickness will be in the range of 2 to 4 mils. Kurary Co. Ltd. supplies such a film, Osaka, Japan and is described in my previously referenced U.S. Pat. Nos. 4,902,558 and 5,059,477.

Alternatively, in yet another embodiment of FIG. 1, a five layer barrier construction may have a barrier characteristic of at least 110 minutes resistance to chemical warfare mustard agent H and a resistance of at least 110 minutes of thickening GD chemical warfare agent based on the methodology described in IAW Military Standard-282, "Filter Units, Protective Clothing, Gas Mask Components and Related Products: Performance Test Methods", test methods 204 and 206 in a five-layer NBC barrier film. In such a five-layer barrier film, it is comprised of a high barrier resin EVOH core layer 12 sandwiched between inner adhesive layers 14 and 16 comprised of an adhesive material. The top of the sandwich, an upper outer layer 18 of low density polyethylene is layered, and at the bottom of the sandwich a similar outer lower layer 20 of low-density polyethylene. Layers 14 and 16 may be comprised of any adhesive capable of causing a lamination of the core 12 and outer layers, 18 and 20 or co extruded with polymeric adhesive layers, such as EVA or blends thereof for layers 14 and 16. The total thickness will range from 2 to 4 mil. Such a barrier film is described in the referenced literature from Ansell Edmont Form # 4H-PP-392.

Alternatively, yet another layer 29 of olefin material, preferably low density polyethylene of 0.50 to 2.0 mils in thickness may optionally be laminated to the upper layer of the barrier film 18 in FIG. 1 or 14 in FIG. 1A for even greater abrasion or NBC resistance and for the carrying pigment or other additives to give desired coloration and reflection characteristics or resistance to ultraviolet radiation or to serve as a printing surface for such purposes as camouflage or any of the earlier described betterments. In the preferred embodiment for protective garments, layer 29 may be omitted from the process where there is no need for these additional qualities. The total thickness of the first component may be from about one to seven mils.

In the most preferred of such alternate embodiments, the three- four- or five-layer barrier film constructions described in FIG. 1 may be utilized in the structure of FIG. 1A, and is further modified by the addition of a layer of release coating 70 the exposed NBC film surface with any of the commonly used materials is well known in the pressure sensitive tape industry art, as by applying a releasing agent that releases upon demand from the type pressure sensitive adhesive that is being used.

Where the fabric substrate 22 is in the form of a layer of reinforcement non-woven fabric, it may be made from lightweight yarns of a polyolefin material, for example supplied by Atlanta Nisseki CLAF, type S in a natural color.

In FIG. 1 and FIG. 1A the lamination of layers 20 and 22 is shown as effected by layer 24 which is comprised of low-density polyethylene material of about 0.50 to 2 mils in thickness. The layers 20 and 22 are bonded to the upper and lower fabric substrate surfaces respectively by such a coating 24, thus serving as an adhesive layer for attaching the fabric reinforcement substrate second component 22 to the barrier film F first component 20-18-16-14-12 in FIG. 1 or FIG. 1A. In the coating layer 24, there may also be included 10-30% fire-retardant material, preferably 20% by weight, PPG FSP 105 should fire-retardant qualities be desired.

In FIG. 1, the release liner 60, is coated with a pressure sensitive adhesive 80 in an adhesive thickness of 1.5-5 mils. The adhesive is then sandwiched to layer 18 of the barrier component F or alternatively to an optional layer 29 as of low density polyethylene, if present.

Alternatively, as shown in FIG. 1A, the adhesive layer 80, in a thickness of 1.5 to 5 mils is applied to the fabric substrate 22 to make the self wound pressure sensitive adhesive tape by any of the various commonly known methods of coating or transferring pressure sensitive adhesive to continuous web materials.

In FIGS. 1 and 1A the two primary components F and 22 are joined together to form the composite NBC barrier fabric. Several methods of joining the layers are practical. For example, the films may be sealed together without adhesive by bringing the layers to a softening point and passing them between pressure rolls. To achieve a successful bond, the heat, pressure, and dwell time must be adjusted in accordance with the type and thickness of the film materials. The lamination bond can be by point or area. Ultrasonic attachment can also be used.

Alternatively, an adhesive coating or layer 24 may be used between the 2 primary components, and laminated by any of the known methods of laminating such as, extruded polymer, hot air, flame, hot melt, point contact, powdered adhesive including but not limited to an adhesive activated by a suitable hot roll and may be from 0.5 mil to 4.o mil thick.

Additionally, FIG. 1 shows the placement of an optional additional layer 29 and the placement of adhesive layer 80 and the release liner 60. The release liner may be 1 to 5 mils. thick, and the adhesive, 1.51 to 5 mils. thick.

Additionally, as previously mentioned, FIG. 1A shows the placement of an optional additional layer 29 and the lower placement of adhesive layer 80 and upper placement of the release coating 70.

Figure 2:
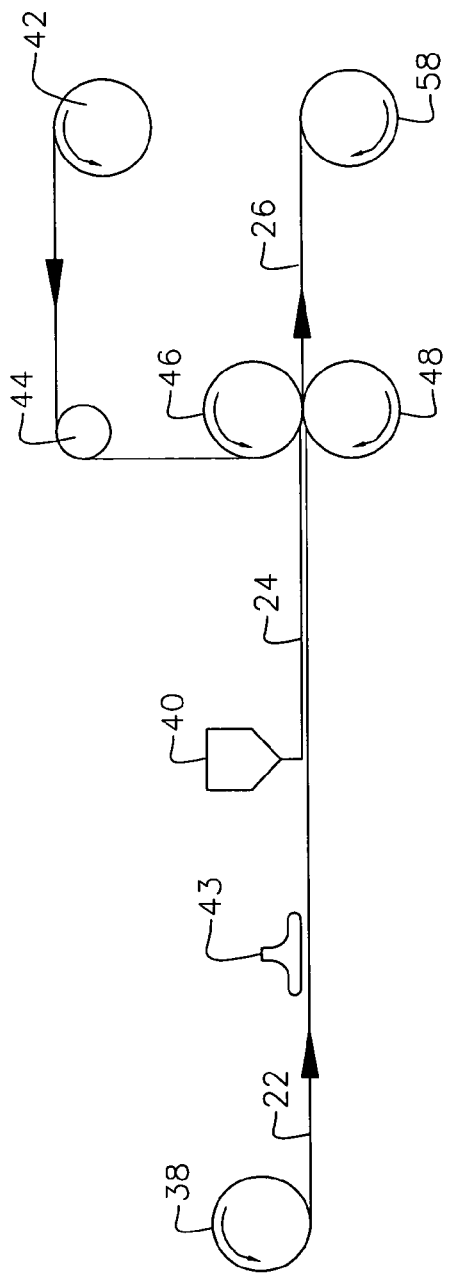
FIG. 2 illustrates process steps in making the base composite fabric of the invention.

FIG. 2 illustrates preferred apparatus and techniques for manufacturing the novel tape structures of the invention, above-described. The first step in the process, is attaching the NBC barrier film F to the fabric substrate 22. Any acceptable reinforcement fabric is unwound in a right-to-left direction from reel 42 and passed over idler roll 44 to be joined with the NBC barrier film F and the extruded polymer 24 as the components are passed between a nip roll 48 and a chill roll 46 at the same time.

The desired NBC barrier film F, such as shown in FIGS. 1 and 1A, and for this example, the NBC SARANEX® 14P film from reel 38, is unwound in a left-to-right direction and is next corona treated at 43 to a surface level of greater than 40 dynes (e.g. 44 dynes) and is next passed beneath the extruder die 40, at which point a layer of low density polyethylene material 24 is deposited to a depth of about 1 to 2 mils over the corona treated surface. The NBC film continues on with the molten polymer coating exposed and is quickly joined with the fabric substrate and passed between nip roll 48 and chill roll 46. The pressing action of the nip roll against the chill roll cause the molten polymer layer to adhere to both the NBC film and fabric surfaces, while at the same time the materials are being pressed together, the chill roll cools and solidifies the molten polymer, fusing the materials together into a single laminated structure 26. The composite laminate 26, (which is the laminated $1^{st}$ and $2^{nd}$ components), emerges from chill roll 46 and nip roll 48 is taken up on a wind-up reel 58.

The time, speed and polymer temperature are well-understood and known art within the industry. The corona treatment step may be eliminated if the NBC film has previously been treated within an acceptable level and time period. The nip roll is TEFLON® material coated. The chill roll may have a surface that produces a smooth, mat and/or an embossed finish. The type of surface on the newly coated laminated barrier film is determined by the surface design on the chill roll.

The laminating and coating material used in layers, 18, 29, 24 may also contain color concentrates, radar illuminating compounds, stabilizers, fillers, anti-oxidants, anti-slip, anti-blocking agents and the like. By way of example, the chemical composition of one of the layers with and without color used is (in percentages):

| WITH COLOR | WITH FR | NATUAL COLOR |
|---|---|---|
| 94.6 LDPE Virgin Resin | 80.0 LDPE Virgin Resin | 100% LDPE Virgin Resin |
| 5.4 Color Pigment | 20.0 Fire-Retardant | |

The LDPE should be an extrusion grade resin such as that available as Eastman Kodak #808P, or Southern Petro NA 203. The melt index may be varied, but one of about 7 is preferred. The color pigment may be AMPACET LD 0925 and the fire-retardant may be PPG FSP 105 or equivalent materials.

Alternatively, additional NBC barriers can be added to the structure by repeating the coating/laminating procedure. The NBC barrier film component from reel 38 may include color and/or UV infrared reflectance additives as well as fire-resistant material.

Figure 3:
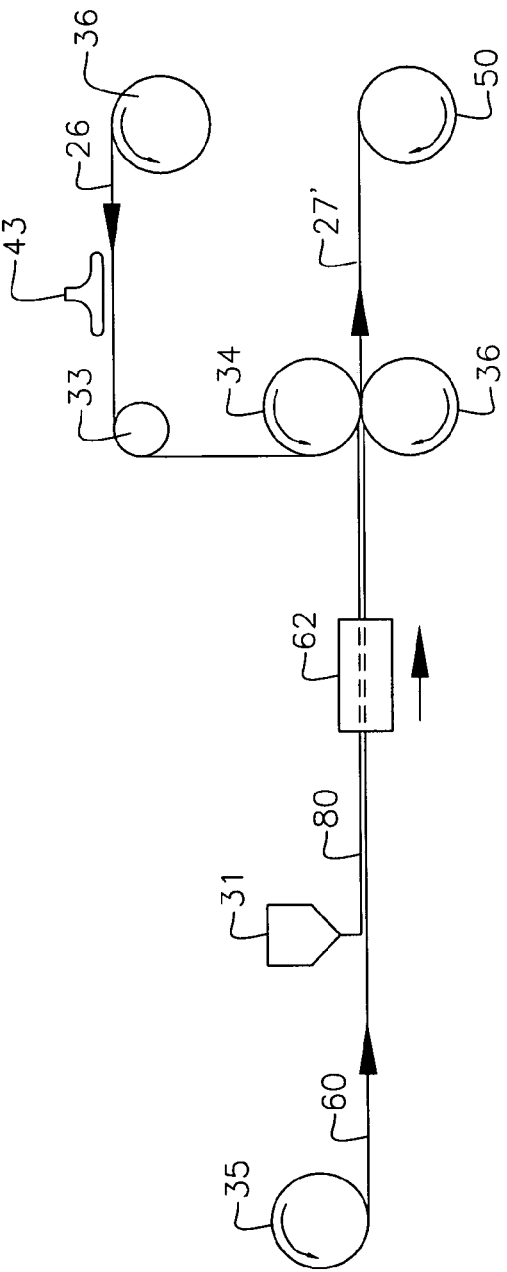
FIG. 3 similarly shows the adhesive and release liner application process of making the composite NBC barrier adhesive tape structure.

FIG. 3, illustrates schematically the equipment for conducting the necessary steps in applying the pressure sensitive adhesive coating to the NBC barrier fabric 26 substrate. A roll of previously laminated NBC fabric substrate material 26 is carried on reel 32. The release liner material 60 (2 to 4 mils thick) is passed from the supply reel 35 under an adhesive application station 31, from which a layer of pressure sensitive adhesive material 80 is deposited upon the silicone coated side of the release liner to a thickness of 1.5 to 5.0 mils. The pressure sensitive adhesive coated release liner continues through a heated oven to cure, dry and evaporate the liquid elements of the adhesive before it is mated with the NBC barrier fabric 26. (Note: The deposited adhesive layer may contain fire-retardant material, color concentrate, UV inhibitors, as well as other additives to modify the desired qualities and performance of the adhesive). While the release liner with the pressure sensitive adhesive coating continues from left to right as shown in the drawing FIG. 3, it passes between nip rolls 36 and roll 34 where it will mate and laminate with the composite NBC barrier laminate 26. This is accomplished by unwinding NBC barrier laminate fabric 26 from unwind reel 32 and prior to mating with the adhesive release liner, the NBC barrier laminate 26 is corona treated 43 to a level approximately minimum level of 44 dynes before being passed through nip rolls 36 and 34. The passage of NBC laminate 26 and adhesive coated release liner through nip rolls 36 and 36 cause the pressure sensitive adhesive to combine and strongly adhere to the corona treated surface of the NBC barrier fabric creating the NBC barrier adhesive tape structure. The NBC barrier adhesive tape is then accumulated on a wind-up roll 50. The NBC barrier adhesive tape structure, is further processed into smaller rolls by converting on standard, known art to the industry by rewinding and slitting the NBC barrier adhesive tape into smaller roll dimensions, such as 2"×50 yards.

Figure 4:
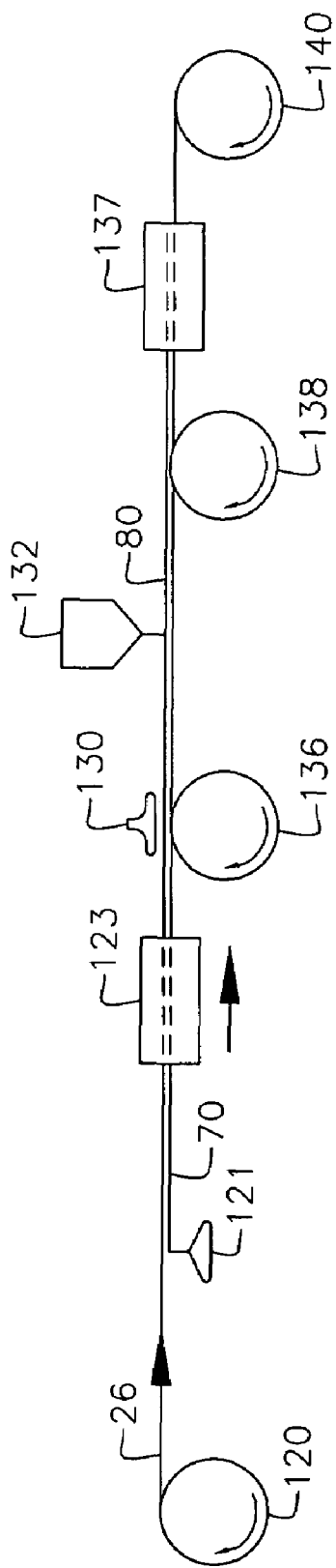
FIG. 4 illustrates an alternate composite barrier application process of a release coating on one side of the barrier fabric while the pressure sensitive adhesive is applied to the opposite surface.

FIG. 4, alternatively illustrates schematically the equipment for conducting the necessary steps in applying the pressure sensitive adhesive coating and the release coating to the NBC barrier fabric 26 substrate to make the self would NBC barrier tape structure. A roll of previously laminated NBC fabric substrate material 26 is carried on reel 120 and is unwound left to right with the smooth film side down to the release coating application station 121, where a layer of release coating material 70 is deposited upon the NBC barrier film surface 18, or alternatively surface 29 if an additional layer is used to cover layer 18. The release coated NBC laminated fabric continues through a heated oven 123 to cure, dry and evaporate the liquid elements of the release coating. While the release coated NBC laminated fabric structure continues from left to right, it next passes through the corona treating station 130 where the reinforcement fabric surface is treated to a minimum level of 40 dynes. The treated fabric surface 22 continues to the adhesive coating station 132, from which a layer of pressure sensitive adhesive material 80 is deposited upon the corona treated surface of the fabric reinforcement 22 to a thickness of 1.5 to 5.0 mils creating a an adhesive coated NBC barrier adhesive tape structure. The pressure sensitive adhesive continues through a heated oven 137 to cure, dry and evaporate the liquid elements of the adhesive before it is mated with the NBC barrier fabric release coating 70 It is further accumulated and wound up on 140. Rollers 136 and 138 are to simulate the transport rollers necessary to carry the NBC barrier fabric from one station to the next station through the machine. (Note: The deposited adhesive layer 80 may contain fire-retardant material, color concentrate, UV inhibitors, as well as other additives to modify the desired qualities and performance of the adhesive). The NBC barrier adhesive tape structure 127, is further processed into "self wound" smaller rolls by converting on standard, known art to the industry by rewinding and slitting the NBC barrier.

However, it is the unique NBC Barrier adhesive tape characteristics as described in the three, four and five layer, high barrier films and its combination with the reinforcement fabric substrate along with the pressure sensitive adhesive constituents with and without a release liner contribute greatly to the nuclear, biological and chemical barrier tape qualities in the ultimate NBC barrier tape product. Thus, the present invention should not be limited to precise details of the examples or processes, but only by the spirit and scope of the appended claims.

What is claimed is:

1. A flexible pressure-sensitive NBC barrier adhesive tape structure containing comprising:
   a NBC multilayered barrier film being resistant to chemical, biological and nuclear agents;
   a strength-imparting reinforcing substrate layer of fabric being fused, by solidified molten polymer, to one surface of the multi-layer barrier film to form a NBC barrier reinforced composite structure, and the reinforcing substrate layer of fabric being one of a non-woven fabric and a woven fabric;
   a pressure sensitive adhesive being secured to one surface of the NBC barrier reinforced composite structure to form a NBC barrier adhesive tape; and
   a separatable release liner covering the pressure sensitive adhesive of the NBC barrier adhesive tape to form the NBC barrier adhesive tape structure so that the releaser liner must be removed from the NBC barrier adhesive tape structure in order to expose the pressure sensitive adhesive of the NBC barrier adhesive tape prior to application thereof to a desired surface.

2. The NBC barrier adhesive tape structure according to claim 1, wherein a low density polyethylene layer is laminated to the NBC barrier reinforced composite structure and the pressure sensitive adhesive is affixed to the low density polyethylene layer.

3. The NBC barrier adhesive tape structure according to claim 1, wherein a low density polyethylene layer is located between the fabric layer strength-imparting reinforcing substrate and the NBC multilayered barrier film for fusing the fabric layer strength-imparting reinforcing substrate to the NBC barrier reinforced composite structure.

4. The NBC barrier adhesive tape structure according to claim 1, wherein adhering of opposite surfaces of a core layer, of the NBC multilayered barrier film, between outer layers of low density polyethylene is effected by at least one interposed layer of an ethyl vinyl acetate copolymer (EVA).

5. The NBC barrier adhesive tape structure according to claim 1, wherein the NBC multilayered barrier film compromises at least one layer selected from the group consisting of vinylidene chloride, vinyl chloride monomer, metallocene, nylon, ethylene vinyl alcohol, polyester, ethyl vinyl acetate, ethylene-acrylic acid polymers, and chlorinated polyethylene.

6. The NBC barrier adhesive tape structure according to claim 1, wherein both the release layer and the pressure sensitive adhesive each have a thickness on the order of about 1.5 to 5 mils.

7. The NBC barrier adhesive tape structure according to claim 1, wherein an outwardly facing surface of the NBC barrier adhesive tape is at least one of:
   has a mat finish,
   has a gloss finish,
   has a light reflecting finish,
   is substantially transparent and
   contains a pigment.

8. The NBC barrier adhesive tape structure according to claim 1, wherein the reinforcing substrate layer is a woven fabric of a high-density polyethylene material which is sandwiched between two layers of a low-density polyolefin material.

9. The NBC barrier adhesive tape structure according to claim 1, wherein said release layer contains a silicone coating which facilitates separation of the release layer from the pressure sensitive adhesive.

10. The NBC barrier adhesive tape structure according to claim 1, wherein the adhesive NBC barrier tape has at least one of a color pigment and a UV stabilizer to protect the pressure sensitive adhesive and the NBC barrier reinforced composite structure from degradation.

11. The NBC barrier adhesive tape structure according to claim 1, wherein a single layer of material; located between the fabric layer strength-imparting reinforcing substrate and the NBC barrier reinforced composite structure, facilitates fusing of the fabric layer strength-imparting reinforcing substrate to the NBC barrier reinforced composite structure.

12. The NBC barrier adhesive tape structure according to claim 1, wherein the NBC barrier adhesive tape structure is in the form a sheet.

13. The NBC barrier adhesive tape structure according to claim 1, wherein the adhesive layer comprises one of synthetic rubber, butyl rubber, butadiene rubber, and acrylic and the fabric substrate is hand-tearable.

14. The NBC barrier adhesive tape structure according to claim 1, wherein the release liner comprises paper with silicone applied to at least one surface thereof.

15. The NBC barrier adhesive tape structure according to claim 1, wherein a layer of an olefin material is applied to the NBC barrier adhesive tape structure on a side thereof opposite to the release layer and the olefin material is a low density polyethylene and has a thickness of between 0.5 to 2.0 mils.

16. A flexible pressure-sensitive NBC barrier adhesive tape structure containing comprising:
   a NBC multilayered barrier film being resistant to chemical, biological and nuclear agents;
   a strength-imparting reinforcing substrate layer of fabric being fused to one surface of the multi-layer barrier film by a low density polyethylene layer, located between the strength-imparting reinforcing substrate layer of fabric and the multi-layer barrier film, to form a NBC barrier reinforced composite structure, and the reinforcing substrate layer of fabric being one of a non-woven fabric and a woven fabric;
   a separatable release liner having a release material on one surface thereof, and a pressure sensitive adhesive being supported by the release material, and the pressure sensitive adhesive being cured to the release liner prior to the pressure sensitive adhesive and the release liner being secured to a surface of the NBC barrier reinforced composite structure, opposite from the strength-imparting reinforcing substrate layer, to form NBC barrier adhesive tape structure, so that the releaser liner must be removed from the NBC barrier adhesive tape structure in order to expose the pressure sensitive adhesive of the NBC barrier adhesive tape prior to application.

17. A flexible pressure-sensitive NBC barrier adhesive tape structure containing comprising:
   a NBC multilayered barrier film being resistant to chemical, biological and nuclear agents;
   a strength-imparting reinforcing substrate layer of fabric being fused to one surface of the multi-layer barrier film by a low density polyethylene layer located therebetween to form a NBC barrier reinforced composite structure, and the reinforcing substrate layer of fabric being one of a non-woven fabric and a woven fabric;
   a pressure sensitive adhesive being secured to a surface of the NBC barrier reinforced composite structure, opposite from the strength-imparting reinforcing substrate layer, to form a NBC barrier adhesive tape, with the pressure sensitive adhesive having thickness of between about 1.5-5 mils; and
   a separatable release liner being between 1-5 mils thick and having a release material, on an inwardly facing surface thereof, so that the release layer covers the pressure sensitive adhesive of the NBC barrier adhesive tape, with the release material engaging the pressure sensitive adhesive, to form the NBC barrier adhesive tape structure so that the releaser liner must be removed from the NBC barrier adhesive tape structure in order to expose the pressure sensitive adhesive of the NBC barrier adhesive tape prior to application thereof to a desired surface.

18. The NBC barrier adhesive tape structure according to claim 17, wherein the release liner is coated with a layer of silicone which facilitates separation of the release layer from the NBC barrier adhesive tape to facilitate use of the NBC barrier adhesive tape.

* * * * *